United States Patent [19]

Evans

[11] Patent Number: 5,042,242
[45] Date of Patent: Aug. 27, 1991

[54] ROTARY LAWN MOWER CLEANING APPARATUS

[75] Inventor: Arthur L. Evans, Putnam County, Ind.

[73] Assignee: Magic Circle Corporation, Coatesville, Ind.

[21] Appl. No.: 539,621

[22] Filed: Jun. 18, 1990

[51] Int. Cl.[5] .................. A01D 34/73; A01D 34/82
[52] U.S. Cl. .................................. 56/255; 56/17.5; 56/295
[58] Field of Search ............. 56/17.5, 255, 295, 320.1, 56/320.2, DIG. 17

[56] References Cited

U.S. PATENT DOCUMENTS

| | | | |
|---|---|---|---|
| 2,676,448 | 4/1954 | Limberger | 56/295 X |
| 2,957,295 | 10/1960 | Brown | 56/295 X |
| 3,157,015 | 11/1964 | Russell et al. | 56/295 X |
| 3,477,214 | 11/1969 | Rogers | 56/295 |
| 3,577,871 | 5/1971 | Engler | 56/255 |
| 3,959,954 | 6/1976 | Halsten | 56/255 X |
| 4,231,217 | 11/1980 | Lucas | 56/295 X |
| 4,306,409 | 12/1981 | Wulfers | 56/255 X |

Primary Examiner—George A. Suchfield
Attorney, Agent, or Firm—Jack Schuman

[57] ABSTRACT

Apparatus is disclosed for continuously cleaning the housing of an operating rotary lawn mower of grass clippings which have been thrown up by the action of the cutting blade on the grass being mowed.

Such apparatus comprises blades or chains radially spaced about the vertical rotatable shaft of the lawn mower, and spaced above the cutting blades and below the bottom of the housing.

1 Claim, 3 Drawing Sheets

ROTARY LAWN MOWER CLEANING APPARATUS

BACKGROUND OF THE INVENTION (1) Field of the Invention.

This invention relates broadly to apparatus for maintaining in clean condition the bottom of the housing of a rotary lawn mower.

More specifically, this invention relates to apparatus for continuously maintaining in clean condition the bottom of the housing of an operating rotary lawn mower by continuously ejecting grass clippings which have been thrown up by the action of the cutting blade on the grass being mowed.

(2) Description of the Prior Art.

Of the two types of lawn mower generally known, viz. reel-type and rotary type, the rotary lawn mower, which may be powered by an electric motor or by an internal combustion engine, is most widely used for a number of reasons, one of which is the ease of changing cutting blades when the blade edges become dull through use.

The operation of a rotary lawn mower involves the rotation, under a housing, of one or more cutting blades in a horizontal plane at a predetermined distance above the lawn being mowed thereby to cut the grass to the desired height. Grass clippings produced by the action of the cutting blade or blades on the lawn are thrown upwardly and are then projected outwardly through a lateral opening in the housing. Some of the upwardly thrown grass clippings impinge on the bottom of the housing in which the cutting blade is mounted, and some of such impinging grass clippings adheres to the bottom of the housing. As the cutting operation continues, the thickness of the grass clippings adhering to the bottom of the housing increases until the cake of grass clippings reaches such a thickness as will interfere with efficient operation of the cutting blade. It then becomes necessary to stop the engine, turn the rotary mower on its side to expose the bottom of the housing, and then peel or break away the adhered cake of grass clippings with a tool such as a blade. Alternatively, such adhered cake may be removed from the exposed bottom of the housing by a strong stream of water issuing from a nozzle attached to a garden hose, which in itself can be a messy operation.

No means are known whereby to continuously eject grass clippings which have been thrown up by the action of the cutting blade of an operating rotary lawn mower, and to prevent the formation on the bottom of the housing of a cake of grass clippings of excessive thickness.

SUMMARY OF THE INVENTION

One of the objects of this invention is to provide apparatus for maintaining in clean condition the bottom of the housing of a rotary lawn mower.

Another of the objects of this invention is to provide apparatus for continuously maintaining in clean condition the bottom of the housing of an operating rotary lawn mower.

A further object of this invention is to provide apparatus for continuously ejecting from the housing of an operating rotary lawn mower grass clippings which have been thrown up by the cutting blade.

Yet another object of this invention is to provide apparatus for continuously preventing the build-up on the bottom of the housing of an operating rotary lawn mower of a cake of grass clippings of excessive thickness.

Other and further objects of this invention will become apparent to those familiar with this art by reference to the accompanying specification and drawings, and to the appended claims.

Briefly, the foregoing objects are attained by mounting cleaning members, which in the preferred embodiments consist of chains or sharpened blades, above the cutting blade and about the axis of rotation of the cutting blade, and below the bottom surface of the housing of the lawn mower in closely spaced relation thereto, which cleaning members rotate with the rotating cutting blade about the same said axis of rotation.

DESCRIPTION OF THE DRAWINGS

Referring now to the drawings in which like numerals represent like parts in the several views.

DESCRIPTION OF THE PREFERRED EMBODIMENTS

Figure 1:
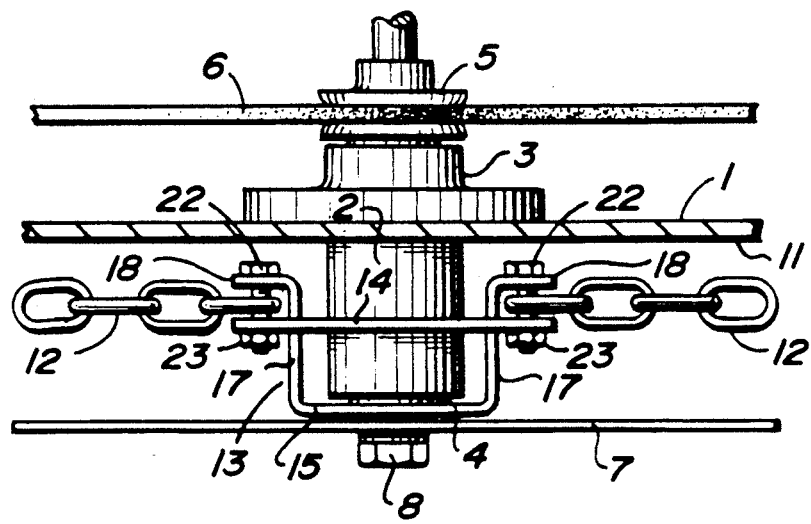
FIG. 1 represents a view in elevation of a portion of the interior of the housing of a typical rotary lawn mower showing a pulley-driven shaft extending through the housing, a cutting blade secured to the bottom of the shaft, and chains constituting one embodiment of the cleaning elements of the present invention mounted by means of brackets to the shaft above the cutting blade and adjacent to the bottom of the housing.
Figure 2:
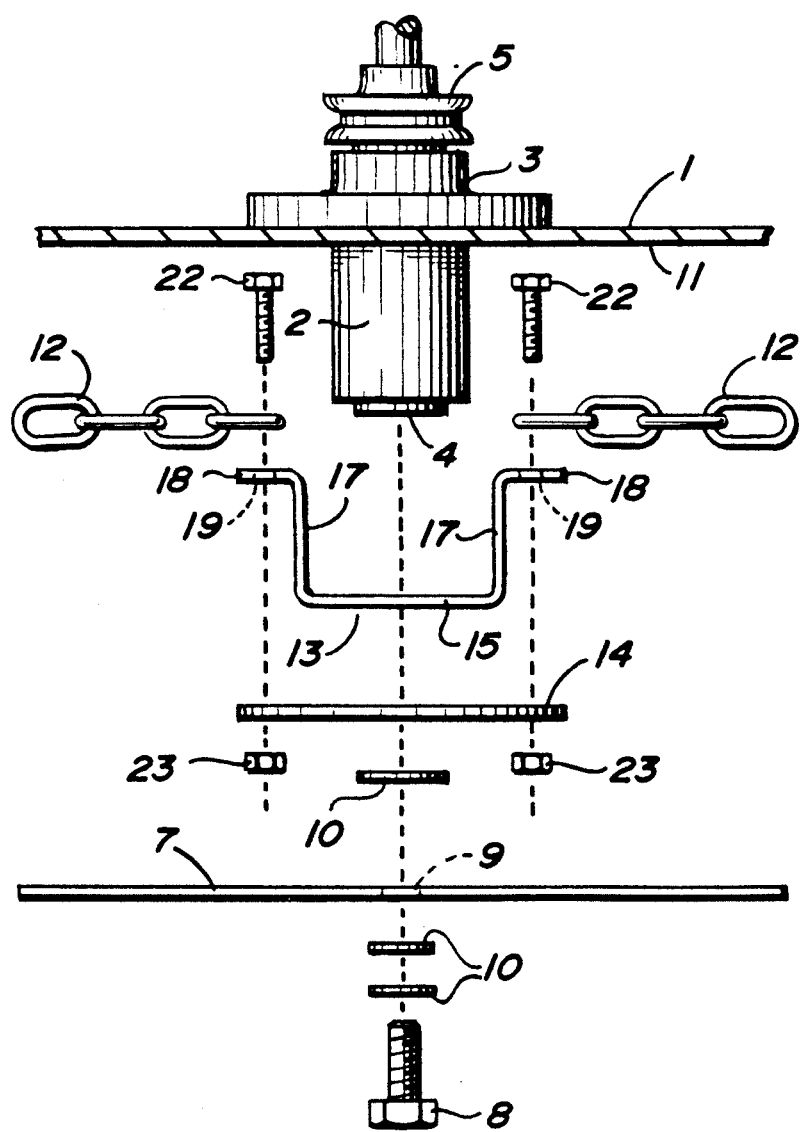
FIG. 2 represents an exploded, enlarged view in elevation corresponding to FIG. 1 and showing the manner of assembly of the apparatus of FIG. 1.
Figure 3:
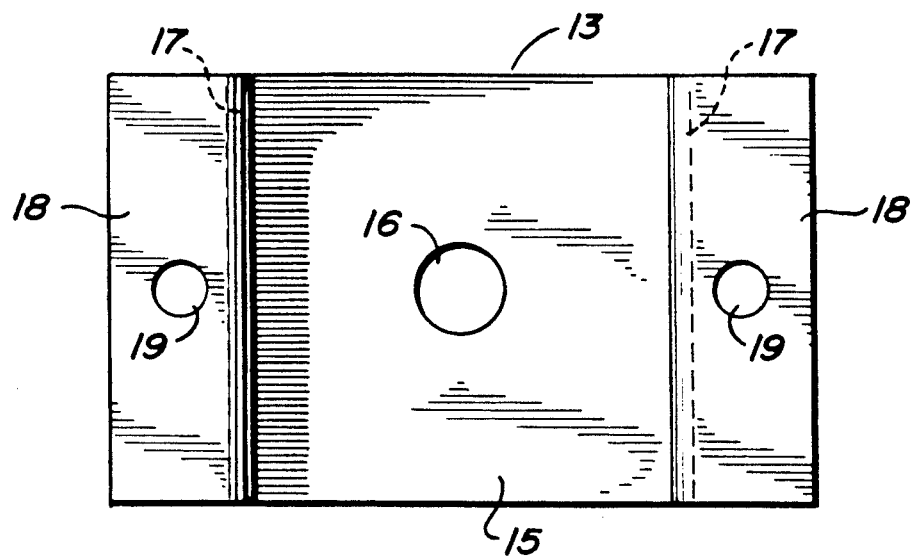
FIG. 3 represents a view in plan of the mounting bracket by means of which the cleaning elements are supported in vertically spaced relationship to the cutting blade and adjacent to the bottom of the housing of the rotary lawn mower.
Figure 4:
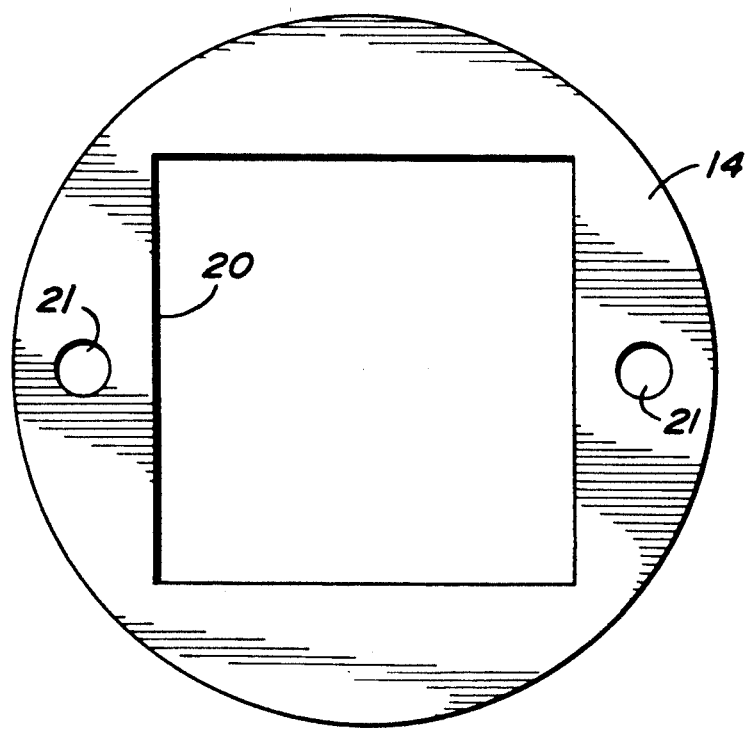
FIG. 4 represents a view in plan of the circular plate by means of which the cleaning elements are secured to the mounting bracket.
Figure 5:
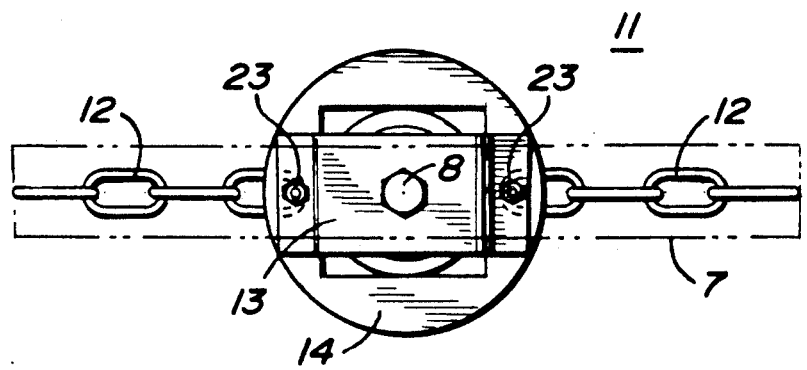
FIG. 5 represents a view looking upwardly toward the bottom of the housing of the rotary lawn mower from below the cutting blade of FIG. 1, the said cutting blade being shown in phantom to avoid obfuscating the present invention.

One type of conventional powered rotary lawn mower is seen in FIGS. 1 and 2 as comprising a housing 1 (otherwise known as a shroud or deck), with bushing 2 extending through housing 1 and secured by flange 3. Shaft 4 is rotatably mounted in bushing 2, projecting below the bottom of bushing 2 and extending above the top of flange 3. Pulley 5 is mounted on the upper end of shaft 4 and is driven by means of driving belt 6 which, in turn, is driven by pulley means connected through a transmission or gear box to an internal combustion engine, none of which latter is necessary to an understanding of the present invention and none of which, therefore, is shown in the drawings.

In such conventional powered rotary lawn mower, cutting blade 7 is secured to the bottom end of shaft 4 by means of threaded bolt 8 extending through a central aperture 9 in cutting blade 7 and threaded into a hole provided therefor in the bottom end of shaft 4. Washers 10 are provided for use in the customary manner.

It will be apparent that operation of driving belt 6 will cause cutting blade 7 to rotate and cut grass on the lawn being mowed.

In another type of conventional powered rotary lawn mower, shaft 4 is directly engaged with, and indeed may be an extension of, the output shaft of an internal combustion engine.

In yet another type of conventional powered rotary lawn mower, an electrically operated motor is employed, instead of an internal combustion engine.

Regardless of the nature of the prime mower driving the shaft 4, in operation, a substantial amount of grass clippings will be thrown upwardly against the bottom surface 11 of the housing 1 by the cutting blade 7. Some of these grass clippings will adhere to the bottom surface 11 of housing 1 and will build up in thickness to the point that a cake of grass clippings extending downwardly from the bottom surface 11 of the housing 1 will interfere with the rotation of cutting blade 7 and thus with the operation of the lawn mower. At some point, it will be necessary to stop the mower and remove this cake of grass clippings. This is usually done by turning the mower on its side and peeling or scraping off from the bottom surface 11 the cake of grass clippings by means of a tool such as a blade. Alternatively, the cake of grass clippings is removed by the force of a stream of water projected through a nozzle attached to a garden hose.

To this point, what has been described will be recognized as conventional.

The preferred embodiments of the present invention will now be described in detail.

Cleaning elements in the form of chains 12 are mounted by means of mounting bracket 13 and plate 14 above cutting blade 7 and closely adjacent the bottom surface 11 of the housing 1, in radially spaced relation around shaft 4. Where, as in the embodiment herein disclosed, two such chains 12 are employed, they are spaced 180° apart about the longitudinal axis of shaft 4 as shown to provide a dynamically balanced arrangement. If more than two chains 12 are employed, the angular distance between adjacent chains 12 will, of course, be less. Thus, with three chains 12, the angular spacing between adjacent chains will be 120°, to provide a dynamically balanced arrangement. It will be seen that with two or three identical chains 12, the said chains are radially equispaced about the longitudinal axis of shaft 4. With four or more chains 12, it will be possible to provide a dynamically balanced arrangement of said chains 12 without a radially equispaced relationship among the said chains 12.

Mounting bracket 13 is formed with base 15 having central aperture 16 therein, legs 17 extending vertically from the ends of base 15, and two flanges 18, each extending outwardly from the free end of one of said vertical legs 17. An aperture 19 is provided through each of said flanges 18. Apertures 19 are spaced the same distance, horizontally, from aperture 16. Aperture 16 is of diameter sufficient to receive bolt 8. Obviously, if more than two chains 12 are employed, there will be an equal number of apertures 19 radially spaced on suitably positioned flanges 18, with suitable angular spacing between said apertures 19 corresponding to the angular spacing between chains 12.

Plate 14 has square aperture 20 formed therethrough and also has apertures 21 extending through opposite sides thereof and registerable with apertures 19 in bracket 13. The distance between opposite sides of square aperture 20 is sufficient to closely receive vertical legs 17 of mounting bracket 13 and also to receive bushing 2. Obviously, if more than two chains 12 are employed, there will be an equal number of apertures 21 radially spaced about the center of plate 14 so as to be registerable with apertures 18.

This preferred embodiment of the present invention is assembled by securing one end of each of chains 12 between flanges 18 of mounting bracket 13 and plate 14. This is accomplished by means of bolts 22 extending through apertures 19 in flanges 18, through the end links of chains 12 and through apertures 21 in plate 14, the said bolts 22 being secured by means of nuts 23 as shown.

Bolt 8 is passed first through central aperture 9 of cutting blade 7, thence through central aperture 16 of mounting bracket 13 and into shaft 4, thereby securing the cleaning elements of this embodiment (chains 12) about shaft 4 in proper relationship to cutting blade 7 and the bottom surface 11 of the housing 1 of the rotary lawn mower.

In the operation of this embodiment, during the course of mowing a lawn, chains 12 will be flung outwardly under the influence of centrifugal force, and will, in fact, be rigidly extended during the course of such mowing operation so as to continuously eject from the housing 1 through a lateral opening therein (not shown) at least a substantial portion of grass clippings which are being thrown up by cutting blade 7 before said grass clippings impinge upon and adhere to the bottom surface 11 of housing 1, and as to those grass clippings which are not so ejected and which impinge upon and adhere to the bottom surface 11 of housing 1, to continuously prevent the build-up of a cake of grass clippings of excessive thickness. The thickness of the cake of grass clippings, if any, remaining on the bottom 11 of housing 1 will, of course, depend upon the clearance, if any, provided between chains 12 and the bottom surface 11 of the housing 1. In the embodiment of FIGS. 1 and 2, this clearance will depend upon the length of bushing 2 relative to the length of vertical legs 17 of mounting bracket 13. It will be apparent that the length of chains 12 must be selected so that the free ends of chains 12 will be clear of the side walls of the housing 1 when radially extended under the influence of centrifugal force. It will be noted that, because square aperture 20 of plate 14 closely receives vertical legs 17 of mounting bracket 13, plate 14 functions as a brace to restrain vertical legs 17 from spreading radially outwardly of shaft 2 because of centrifugal force.

The assembly of chains 12, mounting bracket 13 and plate 14 must be balanced about central aperture 16 of mounting bracket 13, to prevent unbalanced centrifugal forces from developing during operation. Thus, chains 12 should be of substantially equal mass, which means that, if chains 12 are identical, they should be of equal length.

Figure 6:
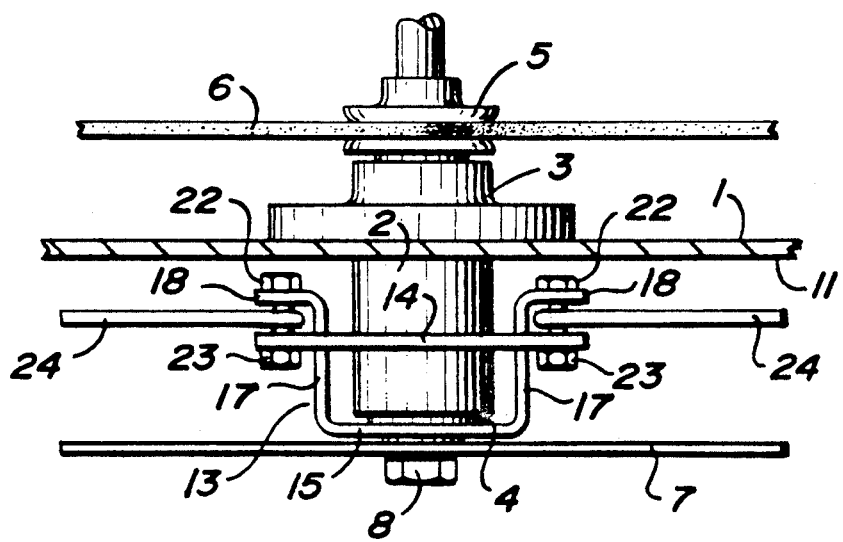
FIG. 6 represents a view in elevation of a portion of the interior of the housing of a rotary lawn mower, similar to FIG. 1, showing another embodiment of the cleaning elements.

In the embodiment of the invention shown in FIG. 6, blades 24, the leading edges (i.e., those edges of blades 24 leading in the direction of rotation) of which are sharpened to provide cutting edges, are substituted for chains 12. In the same manner as with chains 12, one end of each of said blades 24 is secured between a flange 18 of mounting bracket 13 and plate 14 by means of a bolt 22 extending through an aperture in said secured end of the blade 24. The same considerations regarding balancing as stated in connection with chains 12 apply to this embodiment. Thus, blades 24 should be of substantially equal mass which means that, if blades 24 are identical, they should be of equal length.

The embodiment of FIG. 6 is assembled to the rotary lawn mower in the same manner as the embodiment of FIG. 1 and is operated in the same manner. The sharpened edges on blades 24 will facilitate removal of excess cake.

As an alternative to the use of bracket 13 and plate 14 mounting blades 24 about shaft 2 as shown in FIG. 6, and thus as a variation of the embodiment of FIG. 6, the said blades 24 may be secured directly to cutting blade 7 in vertically spaced relation thereto by means of suitable brackets interposed between and fastened to blades 24 and cutting blade 7 in any suitable manner such as welding or riveting.

In the embodiment of FIG. 1, chains 12 function also as blowers to eject grass clippings which have been thrown up by cutting blade 7 and are particularly useful in mowing lawns in wet condition. However, they require more horsepower to operate than the blades 24 of the embodiment of FIG. 6, which do not function as blowers and which are particularly useful in mowing dry lawns.

The foregoing is illustrative of the principles of the invention. Further, since numerous modifications and changes may readily occur to those skilled in the art to which this invention pertains, the invention should not be limited to the exact apparatus shown and described herein, and the appended claims should be construed as covering suitable modifications and equivalents.

I claim:

1. In a rotary lawn mower having a housing with a bottom surface, a vertical rotatable shaft extending through said housing and projecting below the bottom surface thereof, and a cutting blade mounted on the bottom end of said vertical rotatable shaft, apparatus adapted to continuously clean said housing of grass clippings during operation of said lawn mower, said apparatus comprising:
   (a) bracket means adapted to be mounted to said vertical rotatable shaft,
   (b) flange means formed on said bracket means above said cutting blade and adapted to be spaced below the bottom surface of said housing,
   (c) a plurality of chains, each chain having a first end and a second end,
   (d) mounting means adapted to mount the first ends of said chains to said flange means at points radially spaced about said rotatable shaft,
   (e) said chains when mounted in said housing being balanced about said vertical rotatable shaft to prevent the development of unbalanced centrifugal forces,
   (f) said chains being adapted to continuously eject from said housing grass clippings which have been thrown up by said cutting blade during operation of the lawn mower.

* * * * *